United States Patent [19]

Miles

[11] Patent Number: 4,738,446
[45] Date of Patent: Apr. 19, 1988

[54] APPARATUS FOR SECURING EXERCISE WEIGHTS ON SHAFTS

[76] Inventor: David Miles, 280 State St., Albany, N.Y. 12201

[21] Appl. No.: 941,109

[22] Filed: Dec. 12, 1986

[51] Int. Cl.⁴ ............................................. A63B 13/00
[52] U.S. Cl. ..................................... 272/123; 24/581; 24/590; 403/318; 403/359
[58] Field of Search .................. 272/93, 116, 117, 122, 272/123; 403/316, 318, 343, 348, 353, 359; 24/580, 581, 590, 591

[56] References Cited

U.S. PATENT DOCUMENTS

| | | | |
|---|---|---|---|
| 1,779,594 | 10/1930 | Hall | 272/123 |
| 2,066,956 | 1/1937 | Williams | 403/343 |
| 2,708,100 | 5/1955 | Sutliff | 403/343 X |
| 2,708,144 | 5/1955 | Carr | 403/353 X |
| 3,837,753 | 9/1974 | Weiste et al. | 403/353 X |
| 4,579,337 | 4/1986 | Oyeda | 272/123 |
| 4,638,994 | 1/1987 | Gogarty | 403/343 X |
| 4,668,119 | 5/1987 | Galletti | 403/343 X |
| 4,684,284 | 8/1987 | Bradley, Jr. | 403/343 X |

Primary Examiner—Richard J. Apley
Assistant Examiner—Robert W. Bahr
Attorney, Agent, or Firm—Schmeiser, Morelle & Watts

[57] ABSTRACT

A securing mechanism for holding an exercise weight-disc on the end of the lifting bar while allowing a modicum of rotational movement in the disc as the bar is being manipulated by the exerciser. A sleeve-like collar-piece, having a smooth cylindrical bore which has therein a serrated flange, is fitted over the threaded end of a weight lifting bar that has a longitudinal groove passing through the set of threads. The collarpiece is slid onto the threaded end, and into registry with a weight-disc and thereafter rotated so that its rotatable gasket-surfaced face snubs against the weight-disc by virtue of the serrated flange engaging and working in cooperation with the bar threading.

A novel ball-bearing/race, inserted in the collarpiece face, and to which the gasket is affixed, provides a rotatably movable base which will allow the weight-disc(s) to undergo a somewhat constrained rotation as the bar is twisted during lifting exercises.

5 Claims, 2 Drawing Sheets

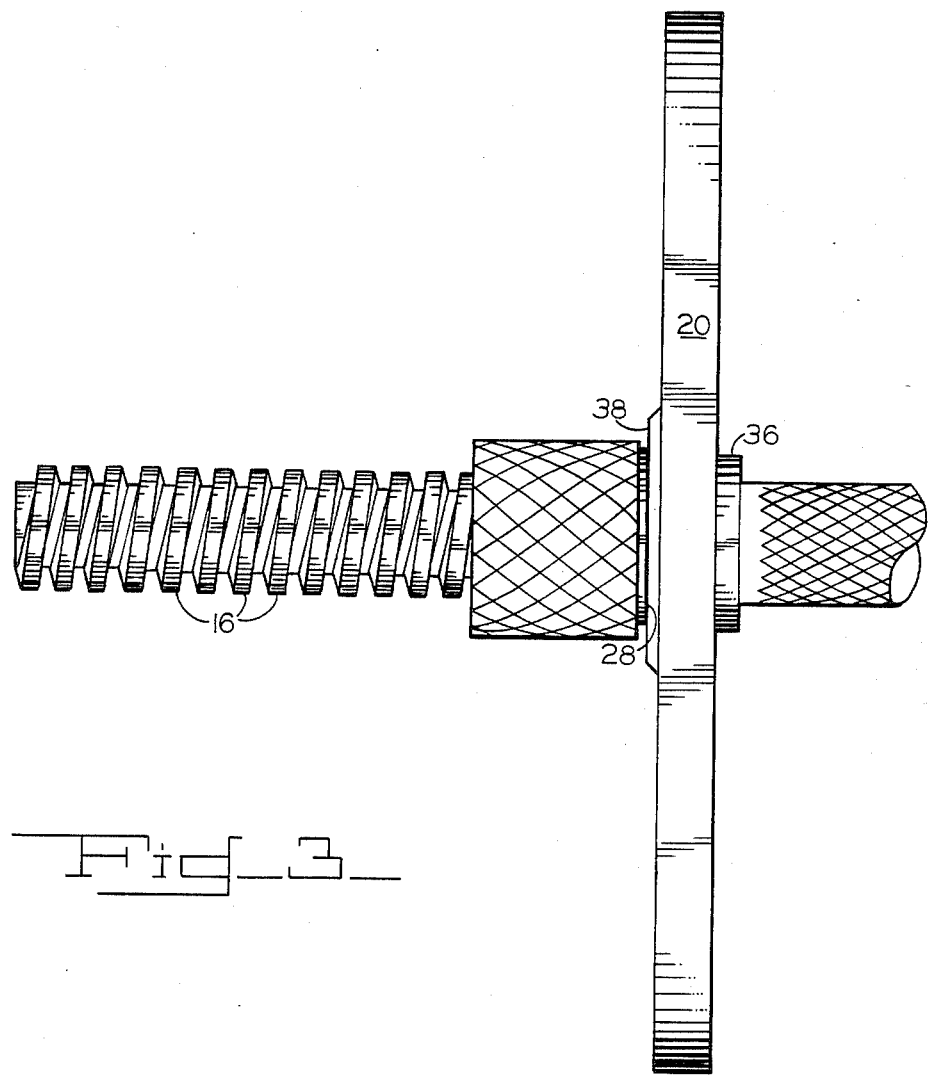
Fig_3

APPARATUS FOR SECURING EXERCISE WEIGHTS ON SHAFTS

FIELD OF THE INVENTION

This invention relates to securement devices in general and more particularly to that set of devices characterized as speed-nuts. A speed-nut is a retaining lug which may be advanced rapidly onto a threaded shaft without undergoing the tedium of rotating it first through the set of threads to its snubbing registration with the object to be secured.

BACKGROUND AND OBJECTS OF THE INVENTION

There are many variations of the speed nut which are used in modern-day industry. The most successful concept that is widely practiced in the art comprises an addition to the ordinary nut which is to be threaded on its corresponding pre-threaded bolt. The difference between this combination and the traditional thread-compatible nut-and-bolt is that the inner threading of the nut is omitted in the speed-nut configuration. In lieu of the internal threading, the speed nut is provided with a smooth bore while a plurality of tabs are affixed to the rear face of the nut, i.e., the face of the nut last passing over the threads, as it is screwed or threaded onto the bolt. These tabs extend radially inward of the nut to a distance that will ensure that, when the nut is placed over the threaded end of the bolt, the free tab ends reside in the grooves of the threads. Thus, as the nut is slid over the end of the threaded bolt, the tabs will be urged away from the face plane of the nut and the nut may be pressed into registry with the object to be held or secured. When the sliding progress of the nut over the bolt threads is completed, or otherwise halted, the tabs reflex and engage the grooves of the threads. At this point, the nut may be advanced (screwed) or retarded (unscrewed) by rotating it in the conventional fashion. It is obvious that the tabs seated in the grooves of the threads now act as intermeshing and traditional nut threads.

A distant limitation of the standard speed-nut is that it functions well only where small threads are used. Such a limitation exists because the flexible tabs become more difficult to exercise, by hand, as the nut and bolt becomes larger and the tabs correspondingly become heavier and less flexible.

The concept of the speed-nut without the aforementioned limitation is embodied in jar capping mechanisms such as are found presently on baby food and condiment jars. In this configuration, the jar generally contains a set of threads at its mouth. The corresponding cap for such a jar is one which will amply envelope the mouth and has, at its open end, a plurality of radially inward projecting tabs that will engage the outer diameter (threaded surface) of the jar mouth. To effect the speed-nut arrangement, the jar threads are interrupted, that is, one could characterize them (the threads) as a set of threads having a plurality of grooves passing therethrough; the grooves are aligned with the cylindrical center line of the jar. Thus, the tabs of the lid are allowed to pass rapidly through the set of threads (sliding through the grooves) until the jar rim and inner cap surface are brought into registry; thereafter, the lid is rotated and its tabs engage the threads for final snubbing and securement of the lid.

The inventor of the subject invention has developed a type of speed-nut which operates in a novel fashion so as to satisfy a long felt need in the physical exercise filed, specifically to secure weight discs in weight lifting apparatus.

During weight lifting exercises with barbells, a proper exercise discipline requires a progressive increase of the number of weight-discs. To this end, the exerciser must intermittently halt the therapy and generally add more discs to the bar. In current practice, it is necessary to remove the securement device, generally a nut or a collar-with-setscrew arrangement. Such collateral activity is time wasting, tedious and intrusive to the proper weight lifting discipline.

It is therefore an object of this invention to provide a means for quick securement of an exercise weight on the end of the lifting bar.

It is another object of this invention to provide the aforesaid securement means which, unlike the traditional speed-nut that must be tediously unscrewed for removal, may be unsecured and removed as rapidly as it was emplaced.

It is yet another object of this invention to provide a means of securement that may be easily performed by hand and without the necessity of additional tools.

It is a concomitant object of this invention that, in achieving the aforementioned objects, a mechanism be provided which is achievable by use of a minimum of traditional fabrication processes, such as may be found in the small machine shop.

Other objects and advantages are set forth within this disclosure or may become apparent to those versed in the art. The inventor has disclosed a novel combination and improvements over the existing art, pointed out the need specifically in the field of exercise-weight lifting, and clearly defined the objects of his invention. The invention therefore consists in the novel constructions, arrangements, combinations and improvements herein disclosed.

SUMMARY OF THE INVENTION

It has been found that the objects of this invention may be realized by forming, preferably machining, a set of threads at the ends of the bar of a typical barbell set. If this set is such as may already have threads, it may be rapidly retrofitted, that is, refitted with the invention so as to embody all of the objectives and advantages thereof. A longitudinal groove or channel is cut into the bar threads from the end of the threaded areas up to the permanent or existing inner flange which serves as the weight stop. A second element, a sleeve or hollow cylindrical collar piece is formed having a smooth inner bore capable of slipping over the outer diameter bar threads, but in relatively close registry therewith. Within the smooth bore of the collarpiece there is a longitudinal, serrated flange which is of a height and width that will allow it to pass into the aforesaid groove or channel when the collarpiece is slipped over the (threaded) end of the bar. This flange-in-groove arrangement allows the collarpiece to be slid rapidly over the length of the threaded end and brought into close registry with either the permanent retaining flange (retaining collar) or a weight-disc which has been inserted therebetween. At the point of such registry, the collarpiece (as distinguished from the permanent inside collar or disc stop) is rotated so that the serrations of its longitudinal flange engage in and mesh with the threads of the bar ends. Rotation of the collarpiece, by hand, in the on-threading direction will snub the collarpiece's front face tightly against the disc, urging it into snug registry with the permanent inside collar or disc stop.

Unique to this arrangement, and an element which makes it particularly useful, is the placement of annular gasket at the weight-engaging face of the collarpiece. The gasket is comprised of a resilient material and is placed as a facing on an annular ball-bearing/race which is inserted, bearing side, into and flush-mounted on the collarpiece face. This novel addition allows the collarpiece to be snubbed against the weight-disc while it (at the same time it secures the latter relative to its placement on the bar) allows the weight assemblies to rotate during lifting and twisting of the bar. This freedom of the weight assemblies to rotate greatly facilitates the lifting therapy by eliminating the counter-torque moment which is generated, as the exerciser's hands twist the lifting bar, during the press movement.

Existing nut-and-bolt type of equipment may be readily adapted to this apparatus by first forming the speed channel (groove) in the bar threads as detailed above. Thereafter, a nut having compatible inner threading may be machined, employing a reciprocating cutter such as a shaper, to remove the nut's threading, except for a portion that will effect the serrated flange element. To aid in easing the snubbing process, the aforementioned rotatable gasket is fitted to the nut face.

The foregoing description, as well as the following detailed description, are exemplary and explanatory of the invention but are not meant to be restrictive thereof. One knowledgeable in the art and using the apparatus for differing functions may readily adapt this concept to his or her specific needs. For example, the inventor has utilized a single collarpiece flange to fit his needs, whereas others may use a plurality of flanges and corresponding thread channels. Likewise, it is not necessary to the practice of this invention to employ a serrated flange running the entire length of the locked collar; but rather, one may use but a single tooth of the serrated flange or, in other words, a singular detent which is conformable to the bar speed-channel and the bar thread pattern. However, since the invention is particularly adaptable to the inventor's application, and well suited to his unique employment thereon, references are made herein to his usage as a practical, useful and preferred embodiment of the invention.

BRIEF DESCRIPTION OF THE DRAWINGS

Of the drawings:

FIG. 3 is a transverse elevation of an exercise bar with a disc secured by the invention.

DESCRIPTION OF THE PREFERRED EMBODIMENT

Figure 1:
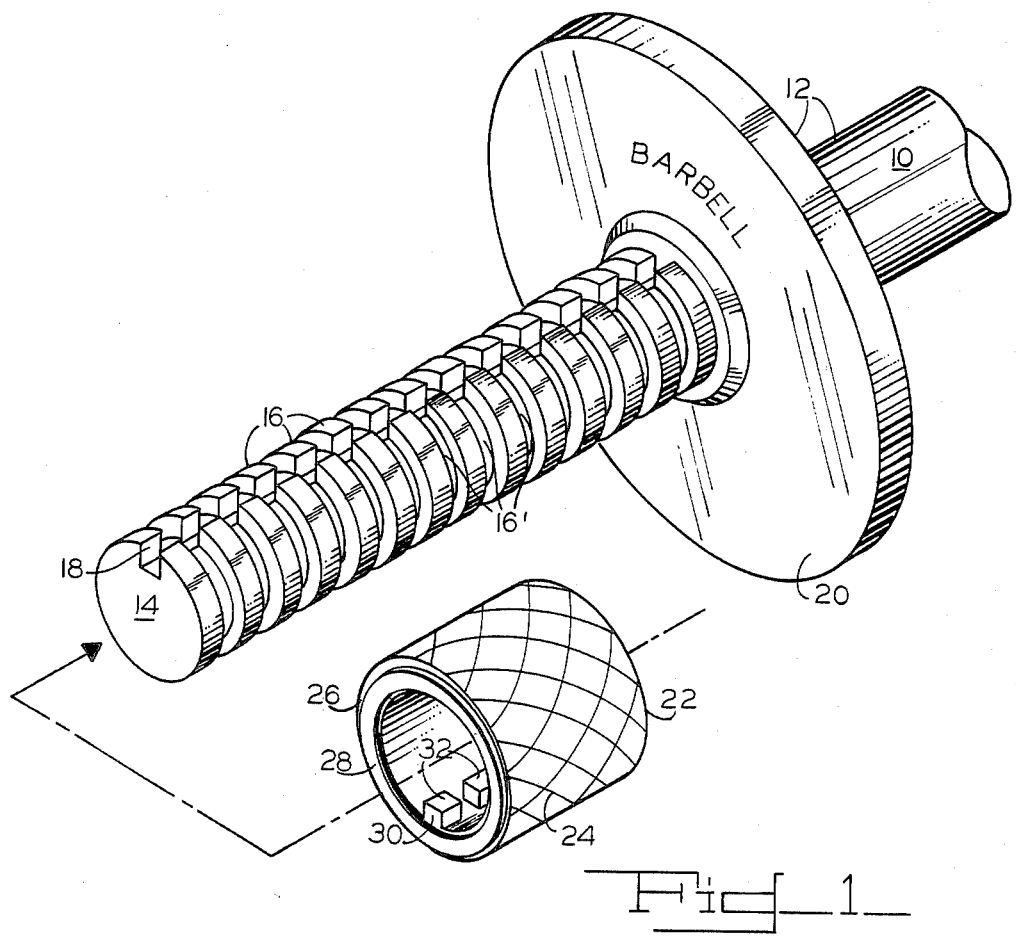
FIG. 1 is an isometric depiction of the invention.

Referring more particularly now to FIG. 1, there is depicted a lifting bar 10 of a typical barbell apparatus 12, of which one end 14 depicts an essentially square cross-sectioned threading 16. A longitudinal channel or groove 18 is cut colinerally to the bar, essentially straight and, at the point of traverse, orthogonally to the threads. Weight-disc 20 has been emplaced on bar 10 and rests in registry with stop 36 (not shown). The second distinct element of FIG. 1 is the collarpiece 22.

Collarpiece 22 is essentially a sleeve, the outer surface of which has been knurled 24 and whose disc-registering face 26 bears a gasket 28 which is comprised of a resilient material. Within the inner core of sleeve 22 there is located a longitudinal serrated flange 30, defined by the series of aligned teeth 32. The reader should note that teeth 32 are adapted to intermesh with the grooves 16' of bar threads 16.

Figure 2:
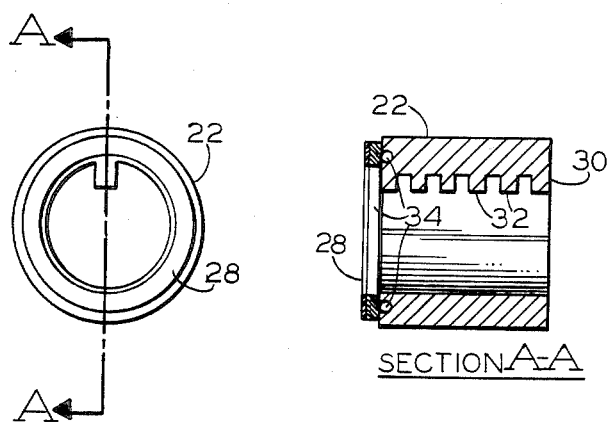
FIG. 2 is an orthographic drawing representing the gasket face and a side cross-section of the collarpiece element.

The orthographic representation of collarpiece 22 in FIG. 2 depicts, particularly in cross section A—A, the inventor's unique addition of bearinged gasket 28. Race and ball-bearings 34 are the apparatus which allows gasket 28 to rotate about the bar 10 longitudinal axis when collarpiece 22 is snuggly secured against disc 20. Flange 30, here depicted in square-shaped serrations or as a series of aligned square teeth 32, exemplifies the inventor's preferred embodiment. However it must be readily understood, that this element of the lock collar may be embodied in a singular tooth, provided that the tooth is like one of teeth 32 and thus conformable to the grooves 16' of bar 10.

FIG. 3 is a transverse view of one end of a weight lifting bar containing the aforementioned apparatus and embodiment. In this view, disc stop 36 is clearly depicted, abutting disc 20. Collarpiece 22 has been slid over the end and up the threaded portion so that gasket 28 is clearly in contact with the integral disc gasket 38 of disc 20. Once collar piece 22 is twisted, so as to snub gasket 28 against disc surface 38, disc 20 will be secured in relatively tight or snug registry with stop 36. The bearing/race feature 34 clearly proves its value as the mounting mechanism for gasket 28 since, as one familiar with weight lifting would readily attest, weight-discs should not remain immobile when mounted and used on the bar. It is common practice for a lifter to rotate the bar while engaging in his or her exercise; it is thus advantageous to allow the discs to rotate relative to the bar and, to this end, said bearing-gasket mechanism of the instant invention is not only novel, but highly functional.

The invention in its broader aspects is not limited to the specific embodiment herein shown and described but may be readily adapted to other situations wherein it is desirable to secure an object to an elongate member conveniently and rapidly while yet allowing said object freedom of rotational movement about the axis of said elongate member. It is precisely this mechanism and function which has been herein embodied; and this, departures may be made therefrom within the scope of the accompanying claims, without departing from the principle herein disclosed and without sacrificing its chief advantages.

I claim:

1. A securing mechanism for holding an exercise weight-disc on the end of an elongate lifting bar, which possesses longitudinally grooved threaded ends, comprising:

a collarpiece, for registry with a weight-disc that has been placed over the end of said lifting bar, comprising a sleeve having a cylindrical bore therethrough, at least one longitudinal flange within said bore, said flange having serrations thereon for intermeshing with the cylindrical threaded surface of said lifting bar ends, said flange engagable with the grooves of said ends, and further comprising a ball-bearing/race with a gasket affixed to the disc-registry surface of said collarpiece, whereby threads adapted to the end of said lifting bar accept and slidably engage said collarpiece flange when said collarpiece is fitted over said end and whereby said mechanism is operated by first placing a weight disc over said threaded end and positioning it to the end of travel, fitting said collarpiece flange-in-groove over said end and sliding it into registry with said disc and thereafter rotating said collarpiece about the bar's longitudinal axis so as to engage its flange serrations with said bar end threads, and further rotating said collarpiece so it is urged into snug registry with said disc.

2. The invention of claim 1 wherein said serrations further comprise a longitudinally oriented series of equidistantly spaced, essentially square teeth of width smaller than the distance between said threads and wherein said threads borne by said bar comprise an essentially square cross-section thread capable of intermeshing with said teeth.

3. In a bar bell exercise apparatus comprising weight-discs and an elongate lifting bar having threaded ends and a longitudinal groove passing through the threads, a weight-disc securing device comprising:
  a sleeve-like collarpiece which has a serrated longitudinal flange in the cavity thereof and a rotatable gasket on its face for snubbing contact registry with a mounted weight-disc, said gasket comprising an O-ring of resilient material, said gasket affixed to the flat annular surface of a ball-bearing and race which is set into the disc-contacting face of said collarpiece, whereby when weight-discs are emplaced on said bar ends and said collarpiece is slid, with said flange in said groove, over a disc-bearing end and placed in registry with said disc, said registry will be effected securely by rotation of said collarpiece and its snubbing against said discs due to engagement of the serrations of said flange with said threads.

4. The invention of claim 3 wherein said ball-bearing and race is set concentrically in the annular solid face of said collarpiece by first cutting an annular groove concentrically in said face and enclosing the ball-bearings therein while admitting the closed surface of the race to rotatable contact with said gasket.

5. A mechanism for securing an object which is slidably mountable on an elongate member so as to prevent retrograde sliding motion comprising;
  a collarpiece having a hole therethrough and at least one detent projecting radially inward from the surface of said hole and further comprising on at least one face of said collarpiece an annular gasket mounted on an annular ball-bearing/race concentric with said hole; and
  an elongate member for mounting a cylindrically bored object thereon, said member having threads adapted to an end thereof, said threads containing the number of orthogonal longitudinal channels necessary to slidably receive said collarpiece detents when said collarpiece is fitted over said end, whereby said collarpiece may be slid into registry with said object to be secured and thereafter rotated so that said detents engage said threads urging said collarpiece into tighter registry with said object to be secured.

* * * * *